No. 639,435. Patented Dec. 19, 1899.
H. S. RINGI.
RELIEF VALVE.
(Application filed Feb. 7, 1899.)
(No Model.)
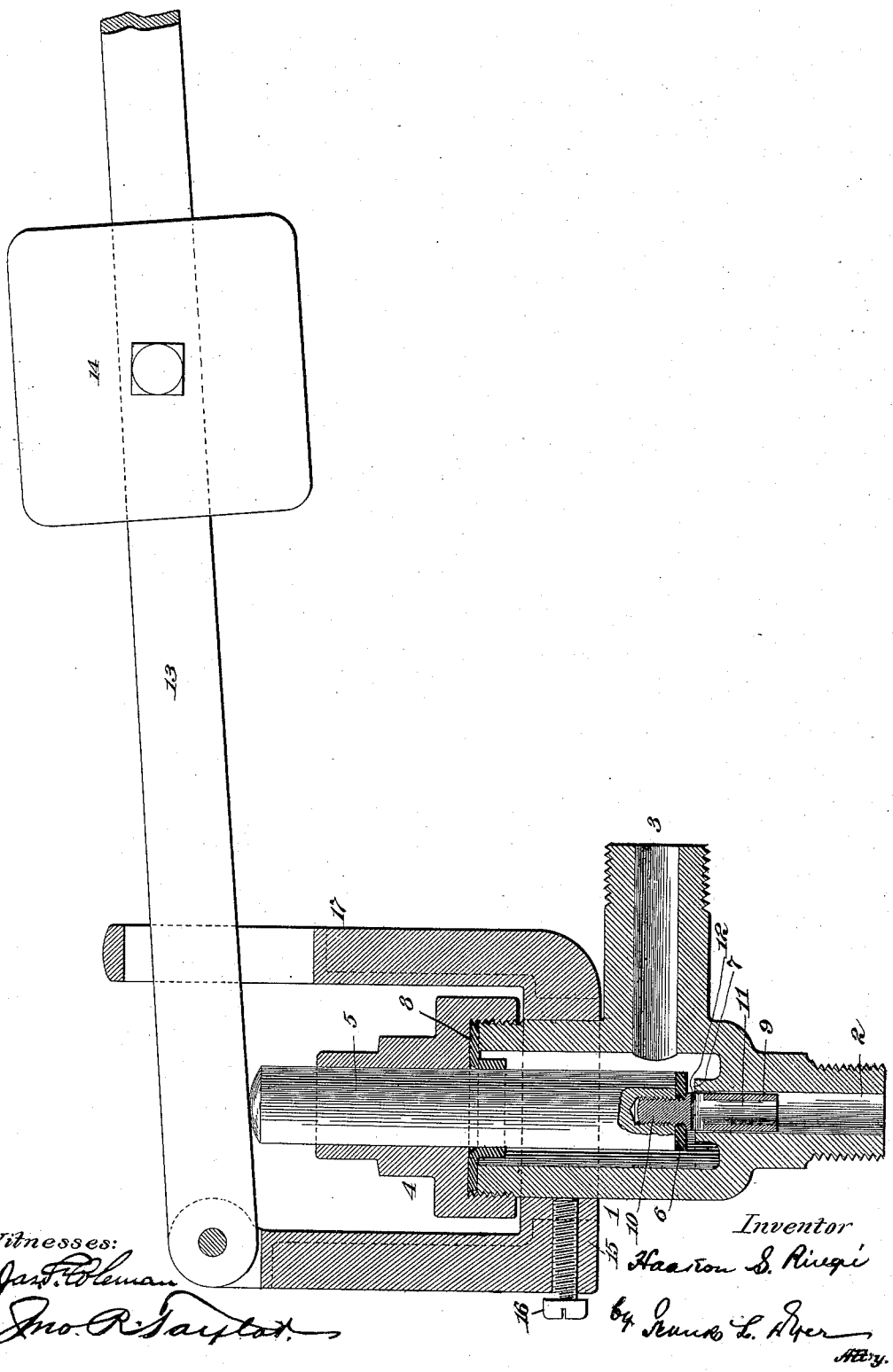

UNITED STATES PATENT OFFICE.

HAAKON S. RINGI, OF CHICAGO HEIGHTS, ILLINOIS, ASSIGNOR TO THE AMERICAN COTTON COMPANY, OF NEW YORK, N. Y.

RELIEF-VALVE.

SPECIFICATION forming part of Letters Patent No. 639,435, dated December 19, 1899.

Application filed February 7, 1899. Serial No. 704,799. (No model.)

*To all whom it may concern:*

Be it known that I, HAAKON S. RINGI, a citizen of the United States, residing at Chicago Heights, in the county of Cook and State of Illinois, have invented certain new and useful Improvements in Relief-Valves, of which the following is a specification.

My invention relates to various new and useful improvements in relief-valves; and the object of the invention is to provide a valve of simple construction and wherein pressure of a liquid, gas, or vapor may be relieved within very close limits.

The invention is particularly designed for securing a substantially uniform pressure in an almost closed hydraulic system, provision being made with the valve to vary such pressure as may be desired.

In order that my invention may be better understood, attention is directed to the accompanying drawing, forming part of this specification, and in which is shown a vertical sectional view of my improved relief-valve.

The generally cylindrical casing 1 of the valve is provided with an entrance-opening 2 and an exit-opening 3, which are connected in any suitable way with the inlet and exhaust pipes.

4 is a removable cap screwed tightly upon the upper end of the casing 1. A plunger 5 is mounted in said cap and carries a packing-disk 6 at its lower end, which coöperates with a seat 7 to open and close the inlet-bore 2. The plunger 5 may be packed with a light gasket 8, although this is not necessary, since in ordinary use the exit-pipe relieves any pressure in the interior of the chamber 1. The lower end of the plunger 5 carries a tube 9, having a screw-thread shank 10 engaging said plunger and holding the packing-disk 6 in place. The said tube 9 fits more or less loosely in the bore 2 and is provided with a vertical passage 11 and the connecting horizontal passages 12 immediately below the packing-disk 6. Pressure on the plunger 5 is secured from a lever 13, having an adjustable weight 14 thereon. Said lever is fulcrumed on a standard made integral with a collar 15, removably secured to the casing 1 below the cap 4 and held in place by a clamping-screw 16, and the said lever is guided by a vertical slot in the upper end of an arm 17, made integral with said collar.

My device, it will be noted, is simple and compact and can be built at low cost. Its operation is as follows:

The pressure of the fluid within the bore 2 when excessive forces the fluid through the passages 11 and 12 of the tube 9 and around the outside of said tube, the escape being between the tube 9 and bore 2 and beneath the packing-disk 6 and seat 7. The escape of the fluid lifts the plunger 5 against the weight 14, allowing for the escape of the fluid, and reduces the pressure in the bore 2 until the weight 14 prevents further escape by forcing the packing-disk 6 on the seat 7. By allowing for a very contracted passage for the fluid in its escape I secure a device whereby the pressure will be relieved within very close limits. In case of a very sudden increase in pressure the elevation of the plunger 5 may be sufficient to connect the passage 12 with the interior of the casing 1, so as to effect a very quick relief; but under ordinary conditions, where the increase in pressure is very gradual, the escape of the fluid is effected only in minute quantities. For this reason it may be possible in certain instances to make the tube 9 solid, the escape of the fluid being permitted only around the exterior thereof.

Having now described my invention, what I claim as new, and desire to secure by Letters Patent, is as follows:

1. In a relief-valve, the combination with a hollow casing having an inlet and an outlet opening, of a seat for the inlet-opening, a loosely-fitting plunger engaging said seat, a tube carried by said plunger and entering said inlet-opening, and a passage connecting the bore of said tube with its exterior, substantially as set forth.

2. In a relief-valve, the combination with a casing 1, of an inlet-opening 2 therein, a seat 7 for said opening, a cap 4 for the casing, a plunger mounted in said cap, a packing-disk on said plunger engaging said seat, a tube carried by the plunger and mounted in the inlet-opening, a ring removably secured to the casing, a weighted lever pivoted to said ring and engaging the plunger, and a guide for said lever carried by said ring, substantially as set forth.

This specification signed and witnessed this 3d day of February, 1899.

HAAKON S. RINGI.

Witnesses:
 MAGNUS SWENSON,
 E. FEWSON.